UNITED STATES PATENT OFFICE.

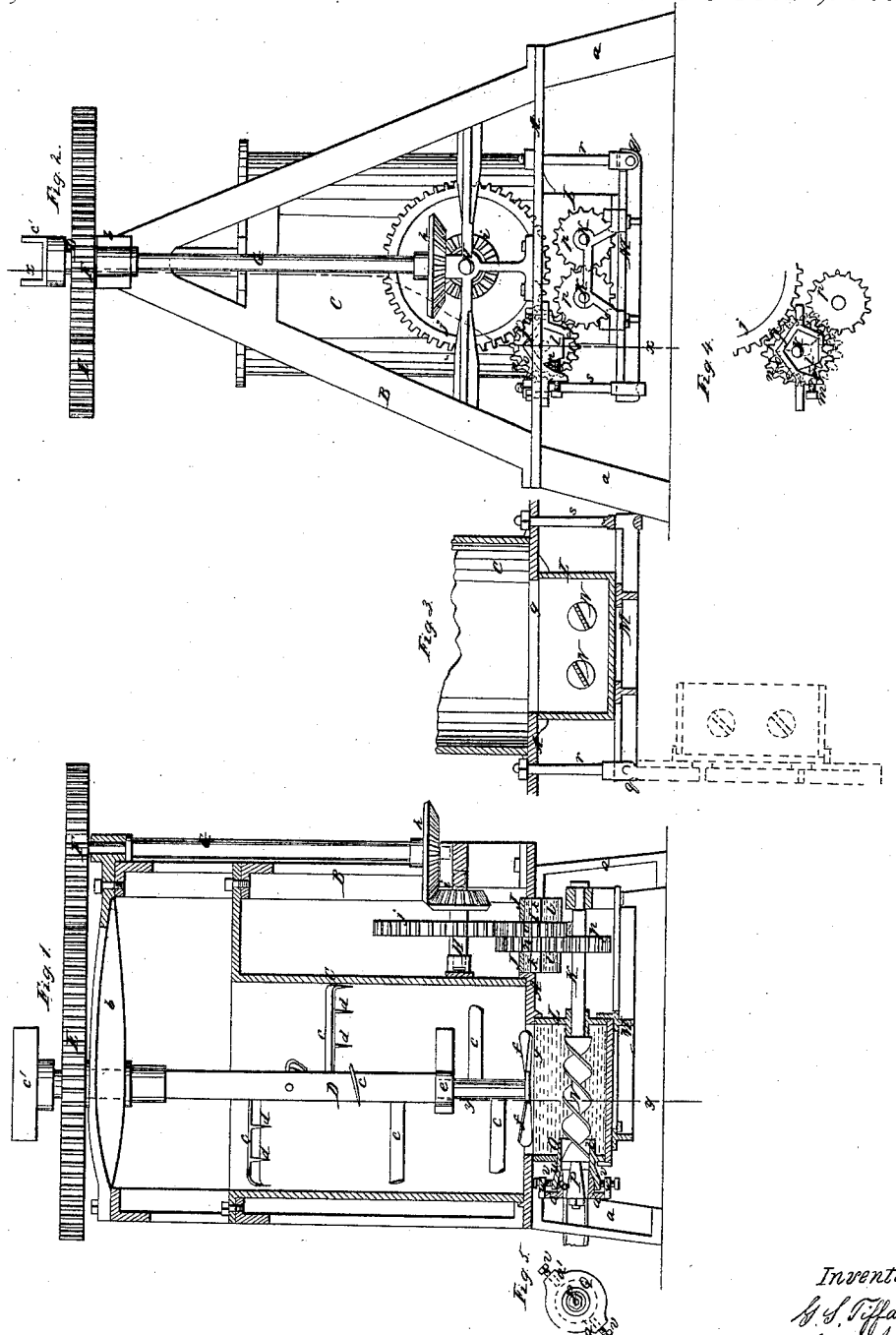

GEO. S. TIFFANY, OF PALMYRA, AND H. C. INGRAHAM, OF TECUMSEH, MICHIGAN; SAID INGRAHAM ASSIGNOR TO SAID TIFFANY.

TILE-MACHINE.

Specification of Letters Patent No. 31,581, dated February 26, 1861.

*To all whom it may concern:*

Be it known that we, GEORGE S. TIFFANY, of Palmyra, in the county of Lenawee and State of Michigan, and HENRY C. INGRAHAM, of Tecumseh, in the same county and State, have invented a new and Improved Machine for Making Tile for Draining Lands and for Similar or Analogous Purposes; and we do hereby declare that the following is a full, clear, and exact description of the same, reference being had to the annexed drawings, making a part of this specification, in which—

Figure 1, is a vertical section of our invention, taken in the line $x. x.$ Fig. 2. Fig. 2, an elevation of the same. Fig. 3, a vertical section of the lower part of the same, taken in the line $y. y.$ Fig. 1. Fig. 4, a detached view of adjustable bearings pertaining to the same. Fig. 5, a detached end view of one of the thimbles pertaining to the same.

Similar letters of reference indicate corresponding parts in the several figures.

This invention relates to a machine for making tubular tiles, such as are used for draining lands, and for similar or analogous purposes.

The object of the invention is to obtain a machine which will mold the tiles very compactly so that the same may be manipulated or handled as they are discharged from the machine without the liability of being injured or marred, the compacting of the clay also rendering the tiles more substantial and less liable to crack under the baking operation.

The invention also has for its object a facile mode of adjusting the gearing for the purpose of varying the speed of the spiral or screw feeders relatively with the feeders of the pug mill so that the molding box may always be kept properly supplied with tempered clay the supply being regulated according to the demand.

To enable those skilled in the art to fully understand and construct our invention we will proceed to describe it.

A. represents a platform or horizontal plate which is supported at a suitable height by pedestals $a.$ and B. is a framing which is attached to the plate A. This framing may be formed of two triangular side-pieces connected at their upper ends by a cross-bar $b.$ C. is an upright cylindrical box which is placed on the platform A. and has a vertical shaft D. placed centrally in it, said shaft being fitted in the cross-bar $b.$ The shaft D. has horizontal beaters or arms $c.$ attached to it, said beaters or arms being inclined in their transverse section and having vertical cutters $d.$ at their under sides, as shown clearly in Fig. 1. The beaters or arms $c.$ extend nearly to the sides of the box C. The lower part of the shaft D. is supported by a bearing $e.$ and to the lower end of the shaft D. there are attached two spiral flanches or blades $f. f.$ which are fitted or work in a circular opening $g.$ at the bottom of the box C. See Fig. 1.

On the upper end of the shaft D. there is secured a wheel E. into which a pinion F. gears, said pinion being on the upper end of a vertical shaft G. attached to the framing, the lower end of said shaft having a bevel wheel $h.$ on it, which wheel gears into a bevel pinion $i$ on a horizontal shaft H. which has a toothed wheel $j.$ on it.

I. is a shaft the journals $k.$ of which are placed in adjustable bearings $l. l.$ The bearings $l.$ are of polygonal form as shown clearly in Figs. 3 and 4, and the journals $k.$ are not fitted centrally in the bearings $l.$ but at one side as shown clearly in Figs. 3 and 4. The bearings $l.$ are fitted in boxes J. which internally are of polygonal form corresponding to that of the bearings, the lower parts of the boxes however are open and the bearings are secured therein by a screw $m.$ On the shaft I. there are placed two toothed wheels $n. o.$ of different diameters. These wheels are placed side by side and either of them may be made to gear into the wheel $j.$ of shaft H. by shifting or reversing the shaft I. in its bearings. In order however to compensate for the difference in the diameter of the wheels $n. o.$ the polygonal bearings $l.$ are used, and by turning or shifting these bearings in their boxes J. the shaft I. may be adjusted nearer to or farther from the shaft H. This will be fully understood by referring to Fig. 4. This shifting of the shaft I. also admits of either wheel $n. o.$ gearing into a wheel $p.$, one of a pair $p. p.'$ which gear into each other and are placed on parallel shafts K. K. which pass horizontally through a box L. below the cylindrical box C.

The box L. may be of rectangular form and secured to a frame M. one side of which is connected by joints or hinges *q.* to vertical rods *r. r.* attached to the platform or horizontal plate A. and the frame at its opposite side is secured by pendent rods *s. s.* See Figs. 2 and 3.

On the portions of the shafts K. K. which are within the box L. there are screws N. N. which extend entirely through the box and have their front ends fitted in sockets O. at the sides of the box L. The sockets O. are of cylindrical form at their inner ends as shown at *t.* but they are of conical or flaring form at their outer parts as shown at *u.* in Fig. 1.

To the outer end of each screw N. there is attached a cone P. The sides of the cones are about parallel with the flaring parts *u.* of the sockets O. as shown clearly in Fig. 1.

Q. Q. are thimbles which externally are of taper or conical form and internally of cylindrical or an approximate form. These thimbles are fitted in the outer flaring parts *u.* of the sockets O. and are secured in the sockets by screws *v.* which pass through flanches *w.* on plates *a'.* at the outer parts of the thimbles, the screws *v* bearing on the ends of the sockets O. See Fig. 1.

The thimbles Q. contract the spaces between the cones P. P., and the sockets O. O. and in connection with the cones P. P. cause the discharge apertures of the sockets O. to be of annular form and much smaller in diameter than at the inner parts of the sockets, as will be fully understood by referring to Fig. 1. The outer bearings *b'.* of the shafts R are on the frame M.

The operation of the machine is as follows: The shaft D. is rotated by any convenient power. If a horse or animal power be used a sweep is secured to a socket *c'.* at the upper end of shaft D. The box C. is supplied with moistened clay and the latter is ground and tempered by the action of the arms and cutters *c. d.* The spiral flanches *f. f.* force the tempered clay into the box L. and the screws N. N. by their rotation, which is imparted to them through the medium of the gearing F. *h. i. j. n. o. p. p'.* force the clay from the box L. through the sockets O. O., the cones P. P. and thimbles Q. Q. causing the clay to be compressed or compacted so that it will be discharged from between the thimbles and cones in firm tubes capable of being handled or manipulated without danger of disfigurement.

The speed of the screws N. relatively with the shaft D. and spiral flanches *f.* is regulated by engaging either of the wheels *n. o.* with the wheel *j.;* this being effected by the adjustment of the shaft I. and its bearings *l. l.* as previously described. This is an important feature of the invention, for it is essential that the box L. be supplied with clay as fast as the screws N. can force it through the sockets and thimbles but no faster, as the latter contingency would create an undue pressure on the screws producing unnecessary friction and wear of the working parts.

The thimbles Q. may vary in size according to the size of tile required. The box L. is rendered very accessible by loosening the rods *s.* so as to detach them from the frame M. the latter with the box being then allowed to swing down as shown in red outline in Fig. 3.

We are aware that screws or spiral flanches have been used, and the same may be seen in Letters Patent granted to George S. Tiffany, Oct. 4th, 1859. We do not therefore claim broadly such device; but, We do claim as new and desire to secure by Letters Patent—

1. The sockets O. in combination with the cones P. on the screws, and the thimbles Q. arranged in relation with the screws N. to operate as and for the purpose set forth.

2. The employment or use of the polygonal bearings *l.* and boxes J. in connection with the wheels *n. o.* of different diameters on shaft I. and arranged in relation with the wheel *p.*, as and for the purpose described.

GEORGE S. TIFFANY.
HENRY C. INGRAHAM.

Witnesses:
I. S. STRONG,
CHARLES HEWITT.